US012794870B2

(12) United States Patent
Seghaier et al.

(10) Patent No.: US 12,794,870 B2
(45) Date of Patent: Nov. 10, 2026

(54) METHOD AND DEVICE FOR DISTRIBUTED ONLINE FILE STORAGE IN A ZERO-TRUST CONTEXT

(71) Applicant: ASTRAN, Paris (FR)

(72) Inventors: Gilles Seghaier, Paris (FR); Julien Doget, Malakoff (FR); Florent Coriat, Massy (FR)

(73) Assignee: ASTRAN, Paris (FR)

( * ) Notice: Subject to any disclaimer, the term of this patent is extended or adjusted under 35 U.S.C. 154(b) by 0 days.

(21) Appl. No.: 19/124,469

(22) PCT Filed: Oct. 27, 2023

(86) PCT No.: PCT/FR2023/051706
§ 371 (c)(1),
(2) Date: Apr. 25, 2025

(87) PCT Pub. No.: WO2024/089378
PCT Pub. Date: May 2, 2024

(65) Prior Publication Data

US 2026/0180966 A1 Jun. 25, 2026

(30) Foreign Application Priority Data

Oct. 28, 2022 (FR) ....................................... 2211306

(51) Int. Cl.
*H04L 29/06* (2006.01)
*H04L 9/40* (2022.01)
*H04L 67/1097* (2022.01)
*H04L 67/56* (2022.01)

(52) U.S. Cl.
CPC .......... *H04L 63/08* (2013.01); *H04L 67/1097* (2013.01); *H04L 67/56* (2022.05)

(58) Field of Classification Search
None
See application file for complete search history.

(56) References Cited

U.S. PATENT DOCUMENTS

| | | | | |
|---|---|---|---|---|
| 9,152,643 | B2 * | 10/2015 | Whitehead | G06F 11/1446 |
| 11,030,062 | B2 * | 6/2021 | Juniwal | G06F 3/067 |
| 11,455,212 | B2 * | 9/2022 | Attarde | G06F 11/1435 |

(Continued)

FOREIGN PATENT DOCUMENTS

CN 110417750 7/2020

OTHER PUBLICATIONS

Adil H. "Off-Chain Data Storage: Ethereum & IPFS" Oct. 17, 2017 (Oct. 17, 2017). pp. 1-4. Retrieved from the Internet: https://web.archive.org/web/20210604233919/https://didil.medium.com/off-chain-data-storage-ethereum-ipfs-570e030432cf [retrieved on May 30, 2023].

(Continued)

*Primary Examiner* — Maung T Lwin
(74) *Attorney, Agent, or Firm* — Perman & Green, LLP

(57) ABSTRACT

A method and a secure zero-knowledge storage system managed by a proxy server connected to a plurality of online storage services, the file to be stored being split into a plurality of fragments saved on the plurality of online storage services, each online storage service being capable of verifying the identity of the user requesting a file, the original file identifier and the link between the original file identifier and the fragment identifier without acquiring knowledge of the original file identifier.

4 Claims, 5 Drawing Sheets

(56) References Cited

U.S. PATENT DOCUMENTS

| | | | | |
|---|---|---|---|---|
| 2016/0212109 | A1* | 7/2016 | Hird | H04L 63/08 |
| 2023/0205830 | A1* | 6/2023 | Lannier | H04L 67/02 707/706 |
| 2024/0137415 | A1* | 4/2024 | Grube | G06F 16/182 |

OTHER PUBLICATIONS

International Search Report for International Application No. PCT/FR2023/051706, dated Jan. 5, 2024.

* cited by examiner

METHOD AND DEVICE FOR DISTRIBUTED ONLINE FILE STORAGE IN A ZERO-TRUST CONTEXT

CROSS REFERENCE TO RELATED APPLICATIONS

This application is a National Stage of International Application No. PCT/FR2023/051706, having an International Filing Date of 27 Oct. 2023, which designated the United States of America, and which International Application was published under PCT Article 21(2) as WO Publication No. 2024/089378, which claims priority from and the benefit of French Patent Application No. 2211306 filed on 28 Oct. 2022, the disclosures of which are incorporated herein by reference in their entireties.

BACKGROUND

Field

The present disclosure relates to the field of online computer file storage with a plurality of storage services in a context where the security of the service does not imply a relationship of trust between the different actors.

BRIEF DESCRIPTION OF RELATED DEVELOPMENTS

Online computer file storage services have developed in recent years. Almost all the big names in computing offer their own service. Alongside these major players, numerous companies have also developed their own service intended for both individuals and businesses. Many businesses now adopt these services to back up their data.

The use of an online storage service makes it possible to avoid the set-up and day-to-day management of storage, its backups and its security. It also allows the costs of the service to be shared between the different customers.

Computer security is also an increasingly sensitive topic. Examples of hacking of businesses and online services are increasing. Even without malicious intent, a recent example of a fire in a data center of a major online service provider could have resulted in data loss for a large number of its customers.

In this context, improving the security and reliability of online storage services is a constant concern.

SUMMARY

The present disclosure is placed in the context where a secure online storage service is managed by a proxy server which provides the link between the service user and a plurality of online storage services. The term server is used here functionally and can refer to various physical implementations of the proxy server comprising one or more physical servers. The term user means a computer terminal used by the human user to access the service. When we use the term user in the description of the proposed methods, it refers to actions performed by the user terminal under its control and not actions performed by the human user.

The user of the secure online storage service only communicates with the proxy server and has no knowledge of the different online storage services used. Similarly, each online storage service only communicates with the proxy server and has no knowledge of the other online services or of the user.

The general operation of the secure online storage service is illustrated in FIG. 1. The user 101 transmits to the proxy server 102 a file 106 to be stored. The proxy server 102 applies to the file 106 a dispersion function generating fragments 107, 108, 109 from the initial file 106. These fragments are stored by the proxy server 102 on the different online storage services 103, 104, 105. This is the uploading operation.

When the user 101 wants to retrieve the stored file, it submits a download request to the proxy server 102. The proxy server 102 then requests the different fragments 107, 108, 109 from the different online storage services 103, 104, 105. From these fragments 107, 108, 109, it restores the initial file 106 and transmits it to the user 101.

The figure illustrates three online storage services. This figure is only an example and any number of online services can be used by a particular aspect of the disclosure with a minimum of two services. Similarly, the figure illustrates a single fragment being saved per online storage service. In practice, several fragments can be stored on the same online storage service.

Advantageously, these fragments include a certain degree of redundancy to allow the restoration of the initial file from only a subset of all of the fragments available for this file. This property provides system resilience against potential loss or compromise of an online storage service.

Advantageously, communications between the user and the proxy server as well as between the proxy server and the online storage services use encrypted tunnels making it possible to ensure the confidentiality of interchanges. Each actor of the system is authenticated by the actors with which it communicates. In particular, the user must be authenticated by the system which issues it an access token which can be verified by the proxy server and/or online storage services.

The user also has a signature key for signing its messages. This signature can be verified, and therefore the messages authenticated as originating from the user by the proxy server and online storage services. This signature key can be symmetric or asymmetric.

Advantageously, the dispersion function makes it possible to ensure that knowledge of a single fragment does not allow an online storage service to restore the initial file. If the system uses redundancy and several fragments are stored on the same online storage service, the system ensures that the number of fragments stored on the same online storage service does not allow restoration of the service.

In terms of security, it is advantageous to offer a so-called zero-trust storage service between the different actors. Thus, if one of the actors is compromised, this does not compromise the security of the solution. In this case, zero trust results in three constraints with which the system is required to comply.

According to a first constraint, an online storage service must be able to verify that a request received from the proxy server actually originated from the legitimate user. This constraint must ensure that the proxy server is not capable of forging a valid request that did not actually originate from the legitimate user. Thus, if the proxy server is compromised, for example by being hacked by malicious individuals, the hackers will not be able to obtain files of users.

According to a second constraint, an online storage service must not be able to identify that two fragments stored by its service are obtained from the same original file. Thus, each fragment is independent and cannot be associated with other fragments of the same original file in order to prohibit any reconstruction of this original file, even partial, by the online storage service.

According to a third constraint, an online storage service must be able to verify the validity of the link between the fragment in its possession and the original file. This is done while respecting the second constraint which does not allow it to obtain this link. The present disclosure aims to offer a secure online storage service based on a proxy server and a plurality of online storage services complying with these constraints.

According to one aspect of the present disclosure, a method for secure storage of an original file is proposed, characterized in that it comprises the following steps:

- reception of the original file, transmitted by a user device, by a proxy server connected to a plurality of online storage services, the original file being associated with an original file identifier;
- generation by the proxy server of a plurality of fragments from the original file, each fragment being associated with a fragment identifier;
- transmission for backup by the proxy server of each fragment to an online storage service among the plurality of online storage services;

where to download the original file stored, the method comprises the following steps:

- reception by the proxy server of a request for the original file comprising the original file identifier and a user data set;

for each fragment:

- transmission of a request for the fragment comprising the fragment identifier and a fragment data set to the online storage service;
- verification by the online storage service, using the fragment data, without acquiring knowledge of the original file identifier, that:
- the request originated from the user having transmitted the request for the original file;
- the fragment identifier of the fragment request matches the identifier of the original file;
- when the verification is positive, transmission of the fragment to the proxy server;
- generation of the original file from the fragments received; and
- transmission of the original file to the user device.

According to one aspect:

- the user data set and the fragment data set comprise an encrypted and signed version of the original file identifier to verify that the request originated from the user having transmitted the request for the original file.

According to one aspect:

- the proxy server generates a zero-knowledge proof based on the original file identifier and on the fragment identifier making it possible to verify that the fragment identifier of the fragment request matches the original file identifier without providing knowledge of the original identifier, this zero-knowledge proof being comprised in the fragment data set.

According to one aspect:

- the user device generates a first commitment based on the original file identifier, this commitment being comprised in the user data and in the fragment data;
- the proxy server generates a second joint commitment based on the original file identifier and on the fragment identifier, this joint commitment being comprised in the fragment data;
- the online storage service jointly verifies the first and second commitments.

According to another aspect of the disclosure, a computer program is provided, comprising instructions adapted for the implementation of each of the steps of the method according to the disclosure when said program is executed on a computer.

According to another aspect of the disclosure, a means is provided for storing information, removable or not, partially or fully readable by a computer or a microprocessor including code instructions of a computer program for the execution of each of the steps of the method according to the disclosure.

According to another aspect of the disclosure, a system is provided comprising a user device, a proxy server and a plurality of online storage services configured to implement a method according to the disclosure.

BRIEF DESCRIPTION OF THE FIGURES

In the appended drawings, given as non-limiting examples.

DETAILED DESCRIPTION

Figure 1:
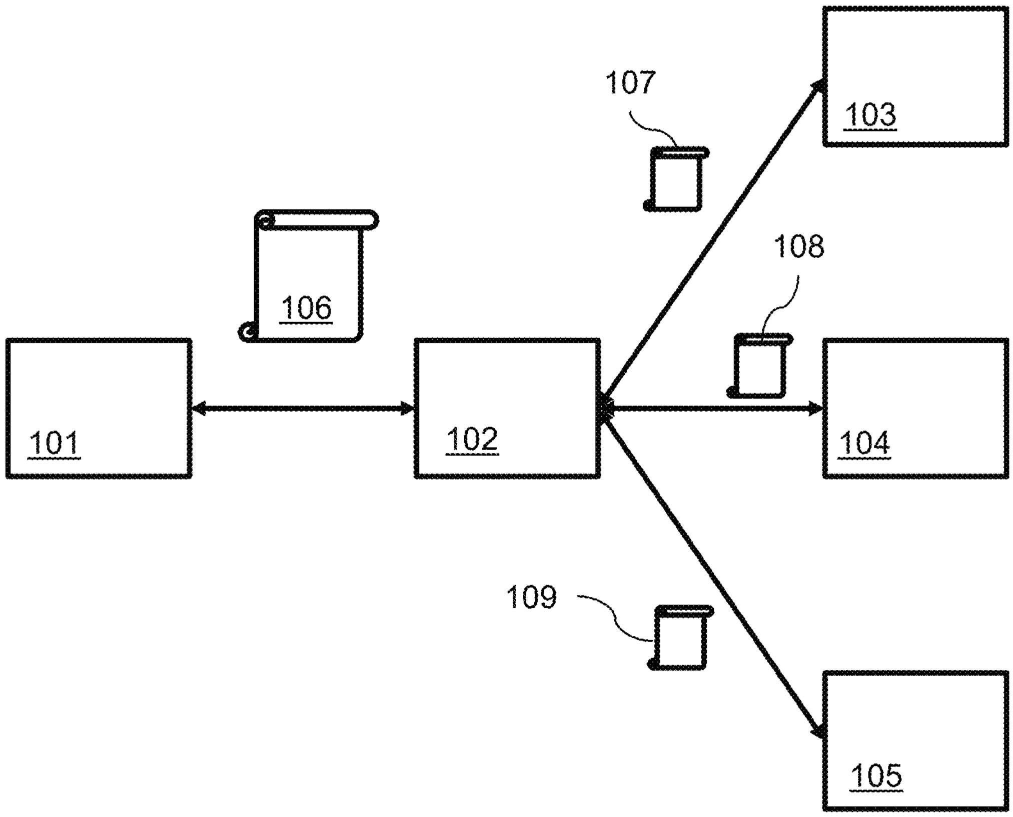
FIG. 1 illustrates the general architecture and operation of a secure online storage service according to one aspect of the disclosure.
Figure 2A:
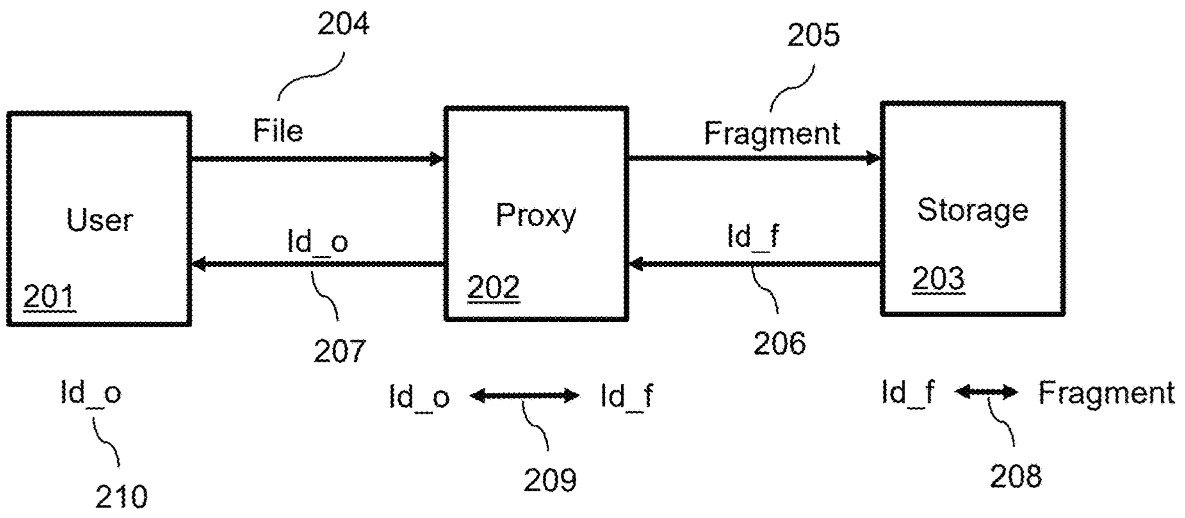
FIGS. 2*a* and 2*b* illustrate the general operation of uploading and downloading a file.
Figure 2B:
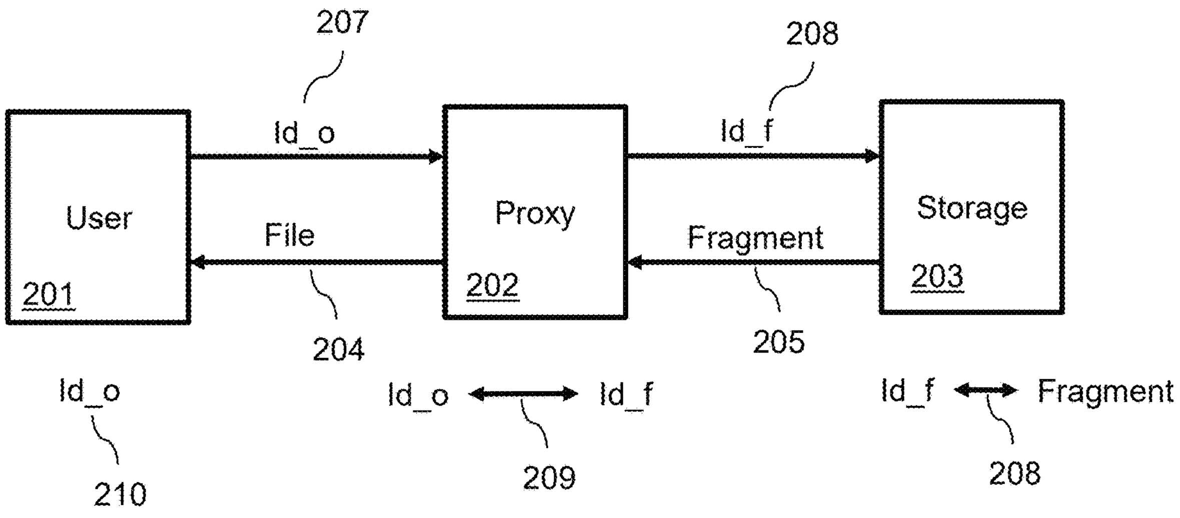

FIGS. 2*a* and 2*b* illustrate the general operation of uploading, FIG. 2*a*, and downloading, FIG. 2*b*, a file.

In these figures, a single online storage service 203 is shown. The same operation applies to the plurality of online storage services connected to the proxy server 202.

File uploading is illustrated by FIG. 2*a*. The user 201 transmits the original file 204 to be saved to the proxy server 202. The latter assigns an identifier 207 Id_o to the original file, transmits it to the user 201 which stores it 210.

The proxy server applies the dispersion function to generate the fragments from the original file. The operation of the dispersion function is not the subject of the present document. The figure illustrates a fragment 205 of this plurality of fragments. The fragment 205 is transmitted to the online storage service 203 which assigns it a fragment identifier Id_f 206 and stores the link 208 between the fragment 205 and its identifier Id_f 206 in memory. The online storage service transmits this fragment identifier 206 to the proxy server which stores the association 209 between the original file identifier Id_o and the fragment identifier Id_f in memory. The other fragments generated by the proxy server receive the same processing not shown in the figure.

The download illustrated in FIG. 2*b* has a symmetric operation. The user 201 transmits to the proxy server 202 a request comprising the identifier Id_o 207 of the file to be downloaded. The proxy server retrieves the associated fragment identifier Id_f that it uses to build a request comprising this identifier that it transmits to the online storage service 203. Using the fragment identifier Id_f, the online storage service 203 retrieves the associated fragment 205 and transmits it to the proxy server 202. The latter, when it has retrieved all the fragments, or at least a sufficient number if redundancy is implemented, reconstructs the original file 204 using the inverse function of the dispersion function. The proxy server can then transmit the original file 204 thus obtained to the user.

In this context, the three constraints to achieve the desired zero-trust security level result in the following constraints:

According to the first constraint, the online storage service must be able to verify that the request received for the fragment actually originated from the legitimate user. According to the second constraint, the online storage service must not be able to know the original file identifier Id_o. According to the third constraint, the online storage service must be able to verify that the requested fragment identifier Id_f matches the original file identifier Id_o, without knowing this original file identifier Id_o according to the second constraint.

The solutions proposed in this document to comply with the security constraints described are based on the use of cryptographic tools. Among these tools, mention will be made of the following functions:

The function KEY GEN which is used to generate a cryptographic key. The key generated can be a symmetric or asymmetric key.

A symmetric key is a key shared between two actors which allows the encryption of a content to obtain an encrypted content. The same key is required to decipher the encrypted content and retrieve the original content. This key is a shared secret between the sender of the encrypted content performing encryption and the recipient of the encrypted content performing decryption.

An asymmetric key consists of a pair of keys, one so-called private key and one so-called public key. To exchange encrypted content between two actors, each has its own asymmetric key. Each actor keeps its private key secret and distributes its public key. In this case, the sender encrypting content encrypts it using its private key and the public key of the recipient. The latter deciphers the content using its own private key and the public key of the sender.

The function ENC(k, m) represents the encryption of a content 'm' using the key 'k'. This is a symmetric key, typically obtained from the function KEYGEN. An asymmetric key can also be used.

The function DEC(k, c) represents the decryption of an encrypted content 'c' using the key 'k'. This is the inverse function of the function ENC(k, m).

The function SIGN(k, m) produces a cryptographic signature of the content 'm' using the key 'k'. This function does not encrypt the content and leaves it readable. The sender of a content 'm' can sign this content using this function. It then transmits the content 'm' and the signature thus computed. The recipient of the content 'm' can verify the signature, for example using the same function and the same key or verification functions according to the aspect. If the signature thus obtained matches the signature received, this means that the content 'c' has not been altered and that it has been signed by the owner of the key 'k'. In the preferred aspect, the signature key is different from the key used to encrypt/decipher messages.

The function HASH(m) is a non-reversible mathematical function that produces a value of fixed size from a content 'm' of any length. The probability of two different contents m1 and m2 producing the same hash value is low enough to consider the HASH function as making it possible to verify the integrity of the content 'm'.

The function ZK-proof(m) used by a producer P, produces a proof that P knows the secret S, where m is the result of the known function f applied to S. The proof can be verified by a verifier V which can then verify that P knows S, without any knowledge about S being transmitted to V. Different ZK-proof functions are known and can be used indifferently in the different aspects of the disclosure. For example, ZK-proof functions are described in the following documents: "Pinocchio: Parno B Howell J, Gentry, C. and Raykova, M. Pinocchio: Nearly practical verifiable computation. In 2013 IEEE Symposium on Security and Privacy, SP 2013, Berkeley, CA, USA, May 19-22, 2013 (2013), pp. 238-252", or "Ligero: Scott Ames, Carmit Hazay, Yuval Ishai, and Muthuramakrishnan Venkitasubramaniam. Ligero: Lightweight sublinear arguments without a trusted setup. In ACM CCS 2017, pages 2087-2104. ACM Press, 2017".

Figure 3A:
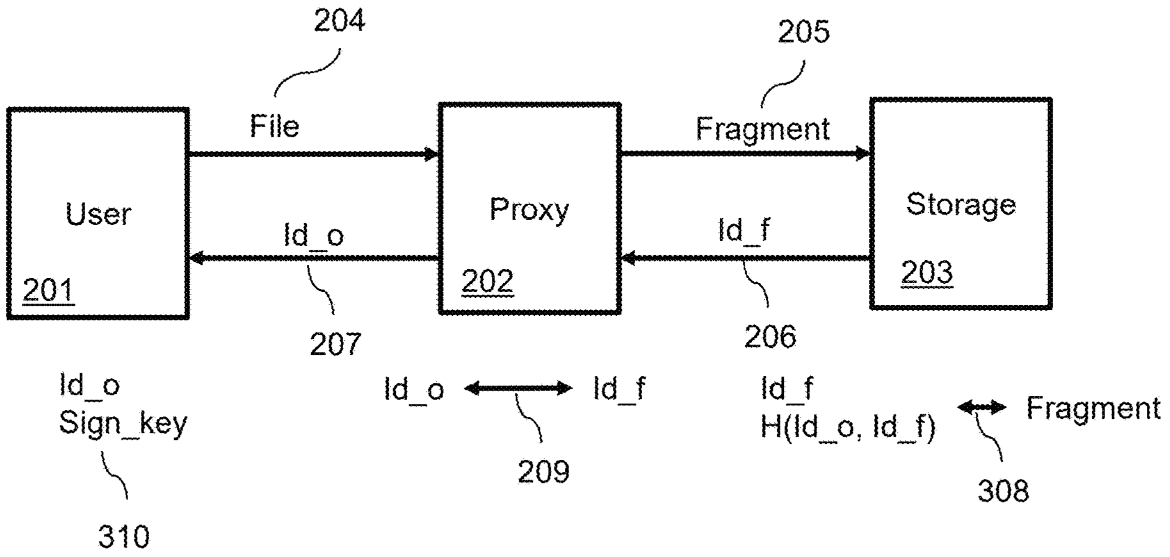
FIGS. 3*a* to 3*b* illustrate a first aspect of the disclosure.
Figure 3B:
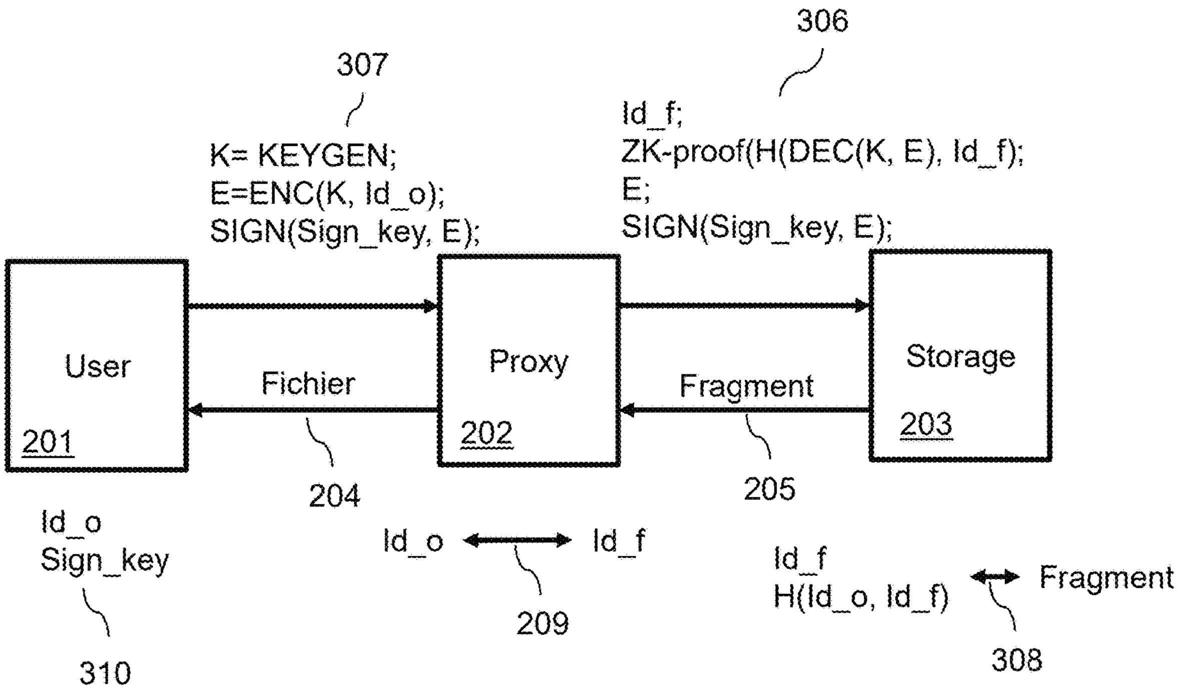

FIGS. 3*a* to 3*b* illustrate a first aspect according to the disclosure. FIG. 3*a* illustrates uploading according to this aspect, while FIG. 3*b* illustrates downloading.

To perform uploading, the user 201 transmits the original file 204 to be stored to the proxy server 202. The latter applies the dispersion function and generates the fragments from the original file. It also associates the original file with the original file identifier 207 Id_o that it transmits back to the user 201. We describe the processing of one of these fragments, the fragment 205 that is transmitted to the online storage service 203 for storage. The online storage service 203 stores the fragment in memory and associates it with a fragment identifier Id_f that is returned to the proxy server. The proxy server then computes a hash of the two identifiers, the original file identifier Id_o and the fragment identifier Id_f, which corresponds to the application of the hash function to the two identifiers: "HASH(Id_o, Id_f)" also annotated as the shortcut "H(Id_o, Id_f)". This hash value is transmitted to the online storage service which stores it in memory with the identifier Id_f and associates it with the fragment via the association 308. Alternatively, the fragment identifier Id_f can be generated directly by the proxy server which can then compute the hash directly in order to avoid a back-and-forth with the storage service. The user also has a signature key "Sign_key" that it stores 310 in memory along with the original file identifier Id_o. This key is typically an asymmetric key thanks to which the user can sign E using its private key. The proxy server and the online storage service are capable of verifying this signature using the public key, but are not capable of generating a potential false signature without knowing the private key of the user.

For downloading, the user generates a key K using the function KEYGEN. Using this key, the user encrypts the original file identifier Id_o to obtain an encrypted identifier E=ENC(K, Id_o). It then uses its signature key to sign the encrypted identifier E thus obtained.

The user then transmits to the proxy server, reference 307, the key K, the encrypted identifier E and its signature SIGN(Sign_key, E).

The proxy server is then able to verify that the encrypted identifier E was actually sent by the user by verifying the electronic signature of E. It can also decipher the original file identifier using the key K. It can then retrieve the fragment identifier Id_f using the association stored in memory, reference 209, between the original file identifier and the fragment identifier. Finally, the proxy server computes the proof ZK-proof(H(DEC(K, E), Id_f)).

The server then transmits to the online storage service, reference 306, the identifier Id_f of the requested fragment, the proof ZK-proof(H(DEC(K, E), Id_f)), the encrypted identifier E and its signature by the user SIGN(Sign_key, E).

The online storage service is then able to verify the proof ZK-proof(H(DEC(K, E), Id_f)), which makes it possible to verify that the proxy server actually has the knowledge of the key K without having access to this key K. It must be understood that here, the function f(x) of the proof corresponds to the function H(DEC(x, E), Id_f). This allows the online storage service to validate that the encrypted value of Id_o, i.e. E, was used for the computation. It can also verify that this encrypted value actually originated from the user by verifying the signature of E. The hash value makes it possible to verify the link between Id_o and Id_f, still without acquiring knowledge of Id_o.

It can be noted that the three zero-knowledge constraints are complied with by the system during the downloading step. The online storage service can verify that the request received actually originated from the legitimate user by verifying the signature of the encrypted value of Id_o, the first constraint. The online storage service does not obtain any information about the original file identifier Id_o, the second constraint. The online storage service can finally verify that the requested fragment identifier, Id_f, matches the original file identifier Id_o, via the hash of the two identifiers, still without knowing Id_o, the third constraint. The proposed system also makes it possible to ensure that the proxy server cannot forge a request not originating from the user because it cannot generate a valid signature of E.

Once these constraints have been verified, the online storage service transmits the requested fragment 205 to the proxy server which restores, using the set of fragments thus retrieved, the initial file 204 to transmit it to the user.

The proposed system makes it possible to ensure the security of user data, even if the proxy server or one or more of the online storage services used is compromised.

Figure 4:
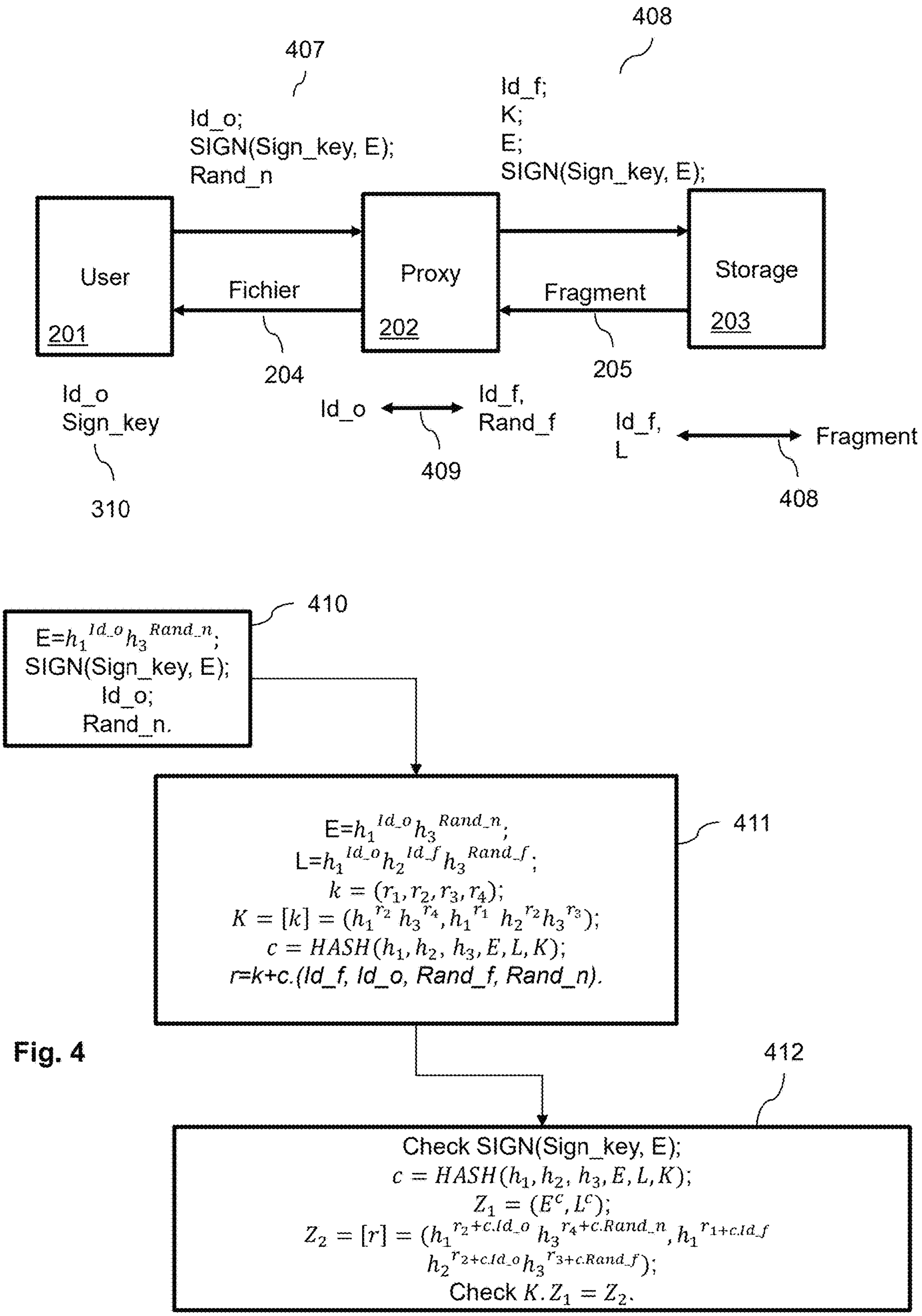
FIG. 4 illustrates a second aspect

FIG. 4 illustrates a second aspect. Unlike the first aspect which is based on a proof of computation, this second aspect is based on a proof of knowledge.

To avoid the storage of Id_o, a joint commitment of the two identifiers Id_o and Id_f allows the proxy server to prove the link between Id_o and Id_f to the online storage service without revealing information about Id_o. In doing so, the second and third constraints can be complied with.

It is also possible to use a second user commitment to allow the proxy server to prove the knowledge of the original file identifier Id_o to the online storage service. The user can also sign this second commitment to additionally provide proof that this original file identifier actually originated from the user. The separate verification of the two commitments does not make it possible to verify that the value of the original file identifier Id_o used for each of the commitments is the same. To do this and thus allow compliance with the three constraints, it is necessary to carry out a single step of joint verification of the two commitments. Thus, the verification makes it possible to ensure, if successful, that the same identifier ID_o was used for the generation of the two commitments. The verification of this identifier Id_o is then complete and also makes it possible to comply with the first constraint.

The proof of knowledge allowing the joint verification of the two commitments can, for example, be based on a set of linear representations described by [MAU09] (Ueli M. Maurer: Unifying Zero-Knowledge Proofs of Knowledge. AFRICACRYPT 2009) which generalizes the proofs of Schnorr [SCH89] (Schnorr, C. P.: Efficient identification and signatures for smart cards. CRYPTO 1989).

In one exemplary aspect, the proof of knowledge can function as follows:

Let P be the prover and V the verifier. Let the spaces $$G = Z_q^4 \text{ and } H = E^2$$

where E is a cyclic group of rank q. Let $h_1, h_2, h_3$ be three distinct public generators of H, distinct means that their discrete logs in H must not be mathematically linked.

Let us define the group homomorphism G→H that associates with the value $(g_1, g_2, g_3, g_4)$, the value $[(g_1, g_2, g_3, g_4)] = (h_1^{g_2} h_3^{g_4}, h_1^{g_1} h_2^{g_2} h_3^{g_3})$. It should be noted here that the two components of the pair defining the group homomorphism will each respectively make it possible to express the two commitments used in this aspect. The form of this group homomorphism will allow the joint verification of the two commitments making it possible to validate that the same value of Id_o is used in the computation of the two commitments.

Let $x = (x_1, x_2, x_3, x_4) \in G$ be a secret known to P, but not to V. The value associated with x in the group H is the value $[x] = (h_1^{x_2} h_3^{x_4}, h_1^{x_1} h_2^{x_2} h_3^{x_3}) \in H$. This value is assumed to be known to V which will use it to verify that P actually has x. The verification can be carried out as follows:

In a first step, P generates a random number corresponding to the pledge risk of the prover $Pk = (k_1, k_2, k_3, k_4) \in G$ and transmits to V the associated commitment $K = [k] = (h_1^{k_2} h_3^{k_4}, h_1^{k_1} h_2^{k_2} h_3^{k_3}) \in H$.

In a second step, V generates a random challenge $c \in Z_q$, and transmits this value to P. Alternatively, it is possible to make the proof non-interactive, by replacing this step with a Fiat-Shamir transformation.

In a third step, P computes:

$$r = k + c \cdot x = (k_1 + c \cdot x_1,\ k_2 + c \cdot x_2,\ k_3 + c \cdot x_3,\ k_1 + c \cdot x_1) \in G;$$

This value r is transmitted to V. The latter can then compute the value corresponding to r in H and verify that this value [r] is indeed equal to $K \cdot [x]^c$.

This example of proof of knowledge can be used in the file storage system. Other proofs of knowledge could also be used in a similar way.

FIG. 4 illustrates an aspect based on proofs of knowledge like those just described.

Uploading is similar to the uploading used in the preceding aspect, except in respect of the computation of a joint commitment $L = h_1^{Id_f} h_2^{Id_o} h_1^{Rand_f}$ by the proxy server from the two identifiers Id_o and Id_f. Rand_f being a random number generated by the proxy server. This joint commitment is transmitted to the online storage service and stored in memory by the latter associated, reference 408, with the fragment. The value Rand_f random is stored in memory, reference 409, by the proxy server.

For downloading, during a first step 410, the user computes a first commitment $E = h_1^{Id\_o} h_3^{Rand\_n}$ using a random number $Rand_n$ generated in this instance. The user signs this commitment E using its signature key Sign_key. The user then transmits the original file identifier Id_o, the commitment signature E and the random value Rand_n used for computing the commitment E to the proxy server.

During a step 407, the values of Id_o, the random value Rand_n and the signature of the first commitment $E = h_1^{Id\_o} h_3^{Rand\_n}$ are transmitted to the proxy server. It is not necessary to transmit the commitment itself, because it can be computed by the proxy server using the values transmitted. It is necessary to note here that the values $h_i$ generating the group H are assumed to be known to all the actors of the system.

During the step 411, the proxy server computes the first commitment E, as well as the second engagement $L=h_1^{Id_o}h_2^{Id_f}h_3^{Rand_f}$ using a random value Rand_f corresponding to that used for uploading. Another random value $(r_1,r_2,r_3,r_4)\in G$ is generated and used to compute the corresponding value K corresponding to the commitment of $k,=[k]=(h_1^{r_2}h_3^{r_4},h_1^{r_1}h_2^{r_2}h_3^{r_3})\in H$. The relay server then computes the value c=HASH, $h_3$,E,L,K which corresponds to the challenge of the verifier V and finally the value r=k+c.(Id_f, Id_o, Rand_f; Rand_n) which corresponds to the proof log.

During the step 408, the values Id_f, the commitment of k K, the proof log r, E, and the signature of E by the user are transmitted to the online storage service.

During the step 412, the storage service is then able to perform the following computations:

The online storage service verifies the signature of the first commitment E, which makes it possible to validate that the value Id_o used actually originated from the user. It then computes the challenge c=HASH, $h_3$, E, L, K, the value $Z_1=(E^c, L^c)$, the value $Z_2=[r]=h_3^{r_4+c.Rand_n}$, $h_1^{r_1+c.Id_f}h_2^{r_2+c.Id_o}h_3^{r_3+c.Rand_f}$. Finally, the verification that $K\cdot Z_1=Z_2$ makes it possible to jointly verify the two commitments E and L, which makes it possible to validate the knowledge by the proxy server of the original file identifier and the link between this identifier and the requested fragment identifier Id_f. The three constraints are therefore verified, which makes it possible to validate the transfer of the fragment 205 to the proxy server. The latter can then, once it has received all the fragments from all the online storage services, restore the original file 204 and transmit it to the user.

Figure 5:
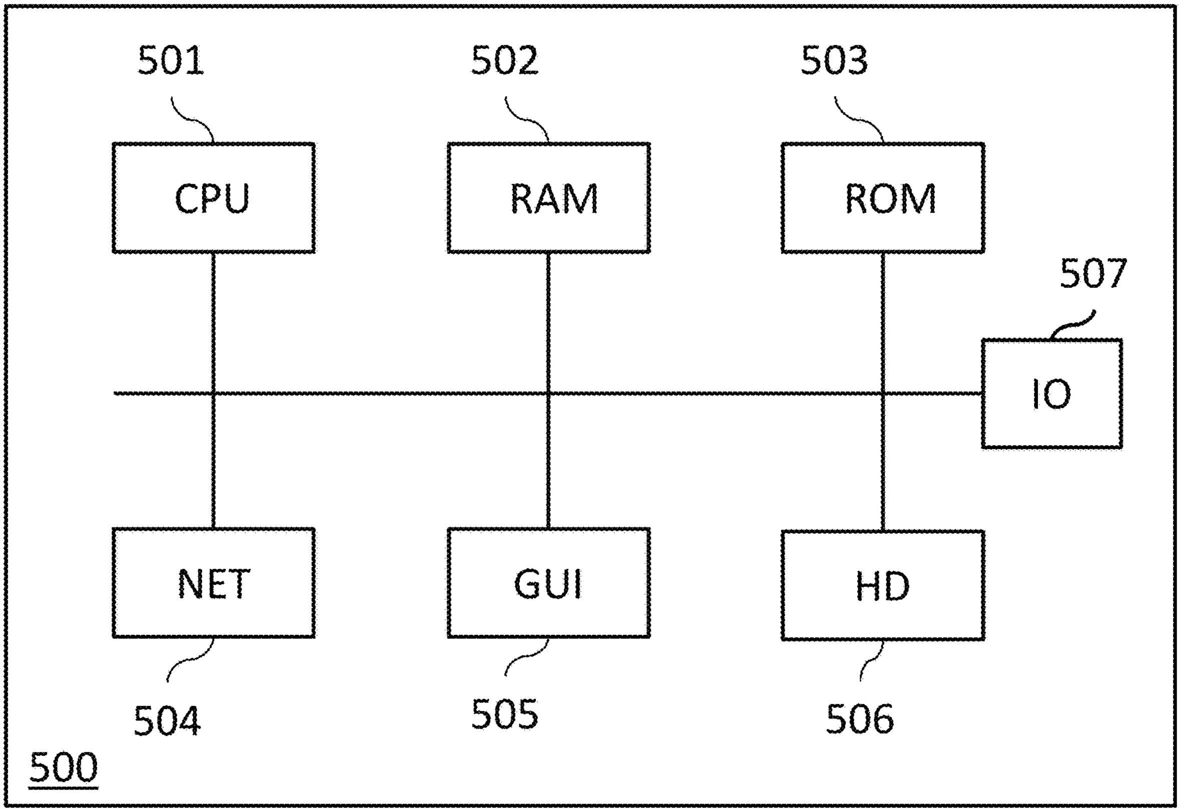
FIG. 5 is a schematic block diagram of an information processing device for the implementation of one or more aspects of the disclosure.

FIG. 5 is a schematic block diagram of an information processing device 500 for the implementation of one or more aspects of the disclosure. The information processing device 500 can be a peripheral such as a microcomputer, a workstation or a mobile telecommunication terminal. The device 500 includes a communication bus connected to:

- a central processing unit 501, such as a microprocessor, annotated CPU;
- a random access memory 502, annotated RAM, for storing the executable code of the method according to the disclosure in memory as well as the registries adapted to save variables and parameters required for the implementation of the method according to aspects of the disclosure; the memory capacity of the device can be supplemented by an optional RA M memory connected to an extension port, for example;
- a read only memory 503, annotated ROM, for storing computer programs in memory for the implementation of the aspects of the disclosure;
- a network interface 504 is normally connected to a communication network on which digital data to be processed is transmitted or received. The network interface 504 can be a single network interface, or composed of a set of different network interfaces (e.g. wired and wireless, interfaces or different types of wired or wireless interfaces). Data packets are sent over the network interface for transmission or are read using the network interface for reception under the control of the software application executed in the processor 501;
- a user interface 505 for receiving inputs from a user or for displaying information to a user;
- a storage device 506 as described in the disclosure and annotated H D;
- an input/output module 507 for receiving/sending data from/to external devices such as a hard drive, removable storage medium or others.

The executable code can be stored in a read only memory 503, on the storage device 506 or on a removable digital medium such as for example a drive. According to one variant, the executable code of the programs can be received by means of a communication network, via the network interface 504, in order to be stored in one of the storage means of the communication device 500, such as the storage device 506, before being executed.

The central processing unit 501 is adapted to control and direct the execution of the instructions or portions of software code of the program(s) according to one of the aspects of the disclosure, instructions which are stored in one of the aforementioned storage means. After power-up, the CPU 501 is capable of executing instructions from the main RAM memory 502, relating to a software application. Such software, when executed by the processor 501, triggers the execution of the methods described.

In this aspect, the device is a programmable device which uses software to implement the disclosure. However, alternatively, the present disclosure can be implemented in the hardware (e.g. in the form of a specific integrated circuit or ASIC).

What is claimed is:

1. A method for secure storage of an original file characterized in that it comprises the following steps:

reception of the original file, transmitted by a user device, by a proxy server connected to a plurality of online storage services, the original file being associated with an original file identifier;

generation by the proxy server of a plurality of fragments from the original file, each fragment being associated with a fragment identifier;

transmission for backup by the proxy server of each fragment to an online storage service among the plurality of online storage services;

where to download the original file stored, the method comprises the following steps:

reception by the proxy server of a request for the original file comprising the original file identifier and user data set;

for each fragment:

transmission of a request for the fragment comprising the fragment identifier and a fragment data set to the online storage service;

verification by the online storage service, using the fragment data set, without acquiring knowledge of the original file identifier, that:

the request originated from the user having transmitted the request for the original file;

the fragment identifier of the fragment request matches the identifier of the original file;

when the verification is positive, transmission of the fragment to the proxy server;

generation of the original file from the fragments received from the plurality of online storage services; and transmission of the original file to the user device.

2. The method according to claim 1, characterized in that:

the user data set and the fragment data set comprise an encrypted and signed version of the original file identifier to verify that the request originated from the user having transmitted the request for the original file.

3. The method according to claim 1, characterized in that:

the proxy server generates a zero-knowledge proof based on the original file identifier and on the fragment identifier making it possible to verify that the fragment identifier of the fragment request matches the original file identifier without providing knowledge of the original identifier, this zero-knowledge proof being comprised in the fragment data set.

4. The method according to claim 1, characterized in that:

the user device generates a first commitment based on the original file identifier, wherein the first commitment being comprised in the user data set and in the fragment data set;

the proxy server generates a second joint commitment based on the original file identifier and on the fragment identifier, this joint commitment being comprised in the fragment data set;

the online storage service jointly verifies the first and second commitments.

* * * * *